United States Patent
Ganem

(10) Patent No.: US 9,401,916 B2
(45) Date of Patent: Jul. 26, 2016

(54) METHOD FOR PROVIDING A USER WITH AN AUTHENTICATED REMOTE ACCESS TO A REMOTE SECURE DEVICE

(75) Inventor: Herve Ganem, Villejuif (FR)

(73) Assignee: GEMALTO SA, Meudon (FR)

( * ) Notice: Subject to any disclaimer, the term of this patent is extended or adjusted under 35 U.S.C. 154(b) by 74 days.

(21) Appl. No.: 13/990,598

(22) PCT Filed: Nov. 18, 2011

(86) PCT No.: PCT/EP2011/070498
§ 371 (c)(1),
(2), (4) Date: May 30, 2013

(87) PCT Pub. No.: WO2012/072430
PCT Pub. Date: Jun. 7, 2012

(65) Prior Publication Data
US 2013/0247163 A1     Sep. 19, 2013

(30) Foreign Application Priority Data
Nov. 30, 2010   (EP) .................................... 10306320

(51) Int. Cl.
*H04L 29/06* (2006.01)
*G06F 21/35* (2013.01)
(Continued)

(52) U.S. Cl.
CPC ............ *H04L 63/0869* (2013.01); *G06F 21/35* (2013.01); *G06F 21/43* (2013.01); *H04L 63/0853* (2013.01); *H04W 12/06* (2013.01); *H04L 2463/082* (2013.01)

(58) Field of Classification Search
CPC ........ G06F 21/35; G06F 21/43; H04W 12/06; H04L 63/0869; H04L 63/0853; H04L 2463/082; H04L 63/0884; H04L 63/08; H04L 63/10

USPC .......................................................... 726/3, 7
See application file for complete search history.

(56) References Cited

U.S. PATENT DOCUMENTS

| 7,529,934 B2 * | 5/2009 | Fujisawa et al. ............... 713/168 |
| 7,770,007 B2 * | 8/2010 | Bobde et al. .................. 713/169 |
| 2003/0005117 A1 * | 1/2003 | Kang et al. .................... 709/225 |

(Continued)

FOREIGN PATENT DOCUMENTS

| EP | 1919156 A1 | 5/2008 |
| WO | WO0180525 A1 | 10/2001 |

OTHER PUBLICATIONS

PCT/EP2011/070498 International Search Report, Dec. 8, 2011, European Patent Office, P.B. 5818 Patentlaan 2, NL—2280 HV Rijswijk.

(Continued)

*Primary Examiner* — Don Zhao
(74) *Attorney, Agent, or Firm* — The Jansson Firm; Pehr Jansson

(57) ABSTRACT

The invention relates to a method for providing a user with an authenticated remote access to a remote secure device (2), said remote access being initiated from a local accessing device (1), said remote secure device (2) embedding secure data related to a specific service, characterized in that it comprises establishing a mutual authentication between said remote secure device (2) and a local secure device (3) different from the local accessing device (1) so as the user of the local accessing device (3) is able to access to the secure data of the remote secure device (2).

8 Claims, 1 Drawing Sheet

(51) Int. Cl.
*G06F 21/43* (2013.01)
*H04W 12/06* (2009.01)

(56) References Cited

U.S. PATENT DOCUMENTS

| | | | |
|---|---|---|---|
| 2003/0005280 A1* | 1/2003 | Bobde et al. | 713/150 |
| 2003/0008637 A1* | 1/2003 | Vatanen | 455/410 |
| 2005/0193201 A1* | 9/2005 | Rahman et al. | 713/169 |
| 2006/0165060 A1* | 7/2006 | Dua | 370/352 |
| 2008/0022383 A1* | 1/2008 | Bobde et al. | 726/10 |
| 2008/0098464 A1* | 4/2008 | Mizrah | 726/5 |
| 2008/0098466 A1 | 4/2008 | Yoshida et al. | |
| 2008/0127320 A1* | 5/2008 | De Lutiis et al. | 726/9 |
| 2008/0287134 A1* | 11/2008 | Catovic et al. | 455/445 |
| 2010/0070760 A1* | 3/2010 | Vanderveen et al. | 713/156 |
| 2010/0107230 A1* | 4/2010 | Tyagi et al. | 726/6 |
| 2011/0197266 A1* | 8/2011 | Chu et al. | 726/5 |
| 2011/0231332 A1* | 9/2011 | Abraham et al. | 705/325 |
| 2012/0019379 A1* | 1/2012 | Ben Ayed | 340/539.1 |
| 2012/0284506 A1* | 11/2012 | Kravitz et al. | 713/151 |

OTHER PUBLICATIONS

PCT/EP2011/070498 Written Opinion of the International Searching Authority, Dec. 8, 2011, European Patent Office, P.B. 5818 Patentlaan 2, NL—2280 HV Rijswijk.

* cited by examiner

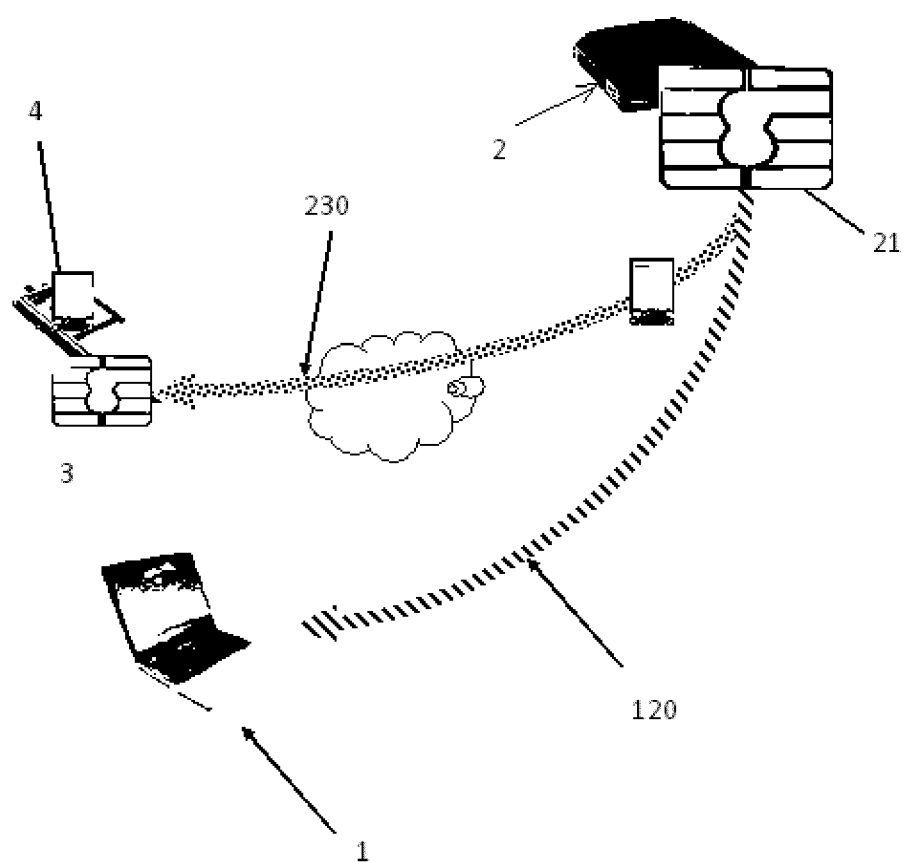

METHOD FOR PROVIDING A USER WITH AN AUTHENTICATED REMOTE ACCESS TO A REMOTE SECURE DEVICE

FIELD OF THE INVENTION

The present invention relates generally to secure devices, and more particularly to a method for keeping the benefits of two factor authentication when using a remotely accessible secure device.

BACKGROUND OF THE INVENTION

Secure devices have been used for years in applications presenting the need for strong security. The exponential growth of the internet has also had the unfortunate side effect of speeding up the dissemination of malware and facilitating access to malware creation techniques. New threats such as spyware have emerged during last decade, making feasible attacks based upon spying the communications between a host and a smart card, and making necessary to adapt the way secure devices are being used.

A traditional architecture for the use of secure devices involves a local connection of those appliances to a host computer. This computer may be a handset, a PC, an ATM machine, or any other type of device. The concept generally used is one secure device connected to one host computer to secure access to a specific service or application from that host computer. An application is typically executed on the host computer which communicates with the secure device, usually by means of APDU commands whenever needed.

The need for a local connection between the secure device and the host computer sometimes creates a problem by limiting the range of devices usable for an application. This problem can go as far as preventing the deployment of application involving smart devices due to the lack of equipment supporting their use.

For example, in the field of secure IPTV devices, on the one hand secure devices are suitable for content ciphering/deciphering, but on the other hand, there is an emergence and a growth of a nomadicity constraints requiring access to the premium TV content any time, anywhere, from any device (PC, Mobile, TV, gamestation . . . ). The multiplication of the form factor of viewing devices makes a lot more difficult the large scale deployment of secure devices for content decryption.

Secure devices offer an attractive value proposition by providing secure data storage, opaque code execution and true random number generation capabilities. The use of secure device usually results in higher security level to protect application data and access to services, primarily because secure devices enable the use of two (and sometimes more) authentication factors: (What You know and What you have).

Up to now applications involving secure devices typically involved a physical connection of the secure device to some host computer (PC, Handset, ATM . . . ) used to access the protected service. Physical presence of the secure device is usually required to validate a credential (such as a pin code) in order to guarantee two factors authentication.

Currently there are emerging applications using secure devices as network entities exposing security services accessible remotely. In this use, there is no a physical local presence of the secure device, hence, the meaning of the "what you have" authentication factor becomes unclear.

It is then an object of the invention to provide a method for preserving the benefits of two factors authentication when using remotely located secure element by using two secure devices working in collaboration. One of them, containing the data or secrets tied to a specific service is remotely located while the other one is "in the hands of the user" . . . . The invention aims to provide a method for secure devices not physically "in the hand" of the user.

Thereto, the present invention provides a method for providing a user with an authenticated remote access to a remote secure device, said remote access being initiated from a local accessing device, said remote secure device embedding secure data related to a specific service, characterized in that it comprises establishing a mutual authentication between said remote secure device and a local secure device different from the local accessing device so as the user of the local accessing device is able to access to the secure data of the remote secure device.

According to one aspect of the invention,
the method may comprise establishing a secure communication channel between the local accessing device and the remote secure device so as to provide a one way authentication, said local accessing device authenticating the remote secure device;
the remote secure device may contact the local secure device using the SIP protocol;
the method may comprise using a peer application in the remote secure device and a peer application in the local secure device so as the two peer applications negotiate the setup of a data session between the remote secure device and the local secure device
the remote secure device may provide a user interface on the local accessing device after the setup of said data session between the remote secure device and the local secure device;
the method may comprise capturing a PIN code entered by the user and sending back said PIN code to the remote secure device for verification;
the remote secure device may grant access to its secure data to the local accessing device after checking the entered PIN code;
the method may comprise using a storage area network as remote secure device;
the method may comprise using laptop PC as local accessing device.

Thanks to the invention, the second secure device, such as a UICC inserted in the user handset, captures a physical interaction to insure two factors authentication.

The invention advantageously provides an application involving remote authenticated access to a secure storage area network from an "anonymous PC".

According to the invention, a functionality of the security application is shared between two distinct secure devices: a remote and a local one. The remote secure device can advantageously contain data and security elements directly related to the service or application, while the local one can take care of the user interaction.

The various aspects, features and advantages of the invention will become more fully apparent to those having ordinary skill in the art upon careful consideration of the following Detailed Description, given by way of example thereof, with the accompanying drawings described below:

BRIEF DESCRIPTION OF THE DRAWINGS

FIG. 1 schematically shows an architecture of a remote access to a remote secure device such as a Storage Area Network device (SAN) holding confidential data according to an embodiment of the invention.

DETAILED DESCRIPTION

The present invention may be understood according to the detailed description provided herein.

Shown in FIG. 1 are a local accessing device such as an anonymous PC 1 which does not necessarily embed a secure element, a remote service device 2 such as a Storage Area Network device (SAN) and a local secure device 3 such as an UICC inserted in a user's handset 4.

The remote service device 2 embeds a remote secure device 21 able to perform on the fly in and out data encryption.

In this method for providing a user an authenticated remote access to the remote service device 2 from the local accessing device 1, which is not necessarily a secured device, the local secure device 3 and the remote secure device 21 both hold secrets and mutually authenticate to each other.

For doing so, the remote service device 2 exposes a secure interface accessible via the HTTPS protocol on the local accessing device 1. The user for example uses the window explorer to browse remote data stored in the remote service device 2. This method provides a convenient access to the remote storage, completely integrated with the windows interface. It will be well understood that other interfaces can be used such as browser based HTTPS based interface, etc. . . .

The user, for example, enters in the windows explorer the HTTPS address of the remote service device 2. The method comprises establishing a secure link or protected tunnel 120 between the explorer of the local device 1 and the remote secure device 21 involving one way authentication relying on a signed server certificate presented by the remote secure device 21. The tunnel 120 is one way authenticated as the local device 1 does not have strong credentials to perform a mutual authentication with the remote secure device 21.

The remote service device 2 requires robust user authentication before authorizing access to the data in its custody. In order to perform the user authentication, the remote secure device 21 contacts the UICC 3 using the SIP protocol for example using a peer application in the remote secure device 21 and in the UICC 3, such as IMS applications registered to an IMS network. They may also be Simple SIP user agents. The two peer applications negotiate the setup of an MSRP session between them. The MSRP session is a data session established between two peers application following a SIP session negotiation. The MSRP link provides a bidirectional data link between the two peer applications. One byte inserted at one end of the pipe by one peer application is received by the other peer application. The MSRP link is secured from end to end and involves a mutual authentication between the two secure devices 21, 3.

In another embodiment, the SIP address at which the remote secure device 21 contacts the user's UICC may have been defined when setting up the remote secure device.

Thanks to the secure MSRP link, the remote secure device 21 transfers a user interface involving the capture of a pin code. In one embodiment, a SIM toolkit commands may be used for describing this user interface. It will be well understood, that it is not a limited example, and if the handset 4 supports for example the smart card web server, HTML based or flash based or any rich media format may be used to carry the interface description.

The UICC application on the handset displays the interface to the user on the handset 4, captures the PIN code entered by the user and sends it back to the remote secure device 21 for verification.

The remote secure device 21 then checks the PIN code and grants access to content of the remote service device to the local device 1 user. The user of the local device 1 may then advantageously different from the user of the local secure device 3.

In another embodiment a mobile network operator, owning the UICC can offer to third party service providers remote user interface display services. The third party service provider deploys a secure device application using a networked secure device to avoid connectivity issues and is able to deploy the service on a wide range of user appliances. The remote service device 2 is an ADSL box 2. IPTV service security elements are stored on the remote secure device 21, while the MNO builds a generic and general purpose remote User interface application usable by many service providers.

As previously described above, the user authentication is done from the PC using the web interface and user name and password, which has the advantage of minimizing the requirements on the accessing PC.

The use of an anonymous PC as local accessing device 1 advantageously minimizes the requirements on client devices and offers enhanced security.

Thanks to this method, once the remote secure device 21 and the local secure device 1 have established a mutually authenticated secure connection, the user is therefore confident that the interface displayed on the handset 4 indeed originates from the remote secure device 21.

It will be well understood that the local secure device (3) may be a UICC able to be inserted in a handset (4) is a not limited example. The local secure device (3) may be a secure memory card inside the handset, or an embedded secure element inside the handset.

When the secure device is remote, the physical interaction may disappear, resulting in the loss of the "what you have" factor which is often used as the "second authentication factor". This method advantageously provides a solution to preserve the second authentication factor linked to "what you have" . . . . This solution providing two secure devices working in tandem, one carrying security elements related to a specific service, and the other "in the hands of the user", requiring the user physical interaction, allows to protect the second authentication factor "what you have".

The invention claimed is:

1. A method for providing a user with an authenticated remote access to a remote service device using two-factor authentication of the user, the user having a local accessing device, said remote access being initiated from the local accessing device, the method comprising:

establishing a mutual authentication between a remote secure device embedded in the remote service device, wherein the remote secure device is a secure element, and a local secure device, wherein the local secure device is a Universal Integrated Circuit Card (UICC), connected to a terminal distinct from the local accessing device so as to authenticate the user of the local accessing device thereby enabling the user access to secure data provided by the remote service device via the local accessing device, by:

establishing a secure communication channel between the local accessing device and the remote secure device so as to provide a one way authentication, said local accessing device authenticating the remote secure device;

using a peer application in the remote secure device and a peer application in the local secure device so as the two peer applications negotiate establishment of a data session between the remote secure device and the local secure device;

further using the peer application in the remote secure device and the peer application in the local secure device to mutually authenticate thereby providing a what-you-have authentication factor;

providing, by the remote secure device, the local secure device with a user interface after the establishment of said data session between the remote secure device and the local secure device;

operating a UICC application on the terminal to which the local secure device is connected to display the user interface from the local secure device onto the terminal;

authenticating the user to the remote secure device using the user interface from the local secure device and displayed on the terminal to which the local secure device is connected thereby providing a what-you-know authentication factor; and upon authenticating the user and the local secure device, providing the user of the local access device access to the secure data provided by the remote service device.

2. The method according to claim 1, wherein the remote secure device contacts the local secure device using SIP protocol.

3. The method according to claim 2, wherein a storage area network is used as the remote service device.

4. The method according to claim 2, wherein a laptop PC is used as the local accessing device.

5. The method according to claim 1, wherein the authenticating the user to the remote secure device using the user interface on the terminal to which the local secure device is connected comprises capturing a PIN code entered by the user on said terminal via the user interface provided by the remote secure device to the local secure device and sending back said PIN code to the remote secure device for verification.

6. The method according to claim 5, wherein the remote secure device grants access to the secure data of the remote service device to the local accessing device after checking the PIN code entered on said terminal.

7. The method according to claim 1, wherein a storage area network is used as the remote service device.

8. The method according to claim 1, wherein a laptop PC is used as the local accessing device.

* * * * *